(12) United States Patent
Jiang et al.

(10) Patent No.: US 12,262,072 B2
(45) Date of Patent: Mar. 25, 2025

(54) LIVE VIDEO LATENCY MEASUREMENT AND CONTROL

(71) Applicant: Microsoft Technology Licensing, LLC, Redmond, WA (US)

(72) Inventors: Yurong Jiang, Santa Clara, CA (US); Vidit Mihirbhai Soni, Sunnyvale, CA (US); Karthiek Chandrasekaran, Fremont, CA (US); Federico Guillermo Hlawaczek, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/537,313

(22) Filed: Nov. 29, 2021

(65) Prior Publication Data

US 2023/0108310 A1 Apr. 6, 2023

Related U.S. Application Data

(60) Provisional application No. 63/252,578, filed on Oct. 5, 2021.

(51) Int. Cl.
*H04N 21/24* (2011.01)
*H04N 21/2187* (2011.01)
*H04N 21/234* (2011.01)
*H04N 21/242* (2011.01)

(52) U.S. Cl.
CPC ......... *H04N 21/24* (2013.01); *H04N 21/2187* (2013.01); *H04N 21/23418* (2013.01); *H04N 21/242* (2013.01)

(58) Field of Classification Search
CPC ............... H04N 21/2187; H04N 21/24; H04N 21/23418; H04N 21/242
See application file for complete search history.

(56) References Cited

U.S. PATENT DOCUMENTS

| | | | |
|---|---|---|---|
| 8,935,432 B1* | 1/2015 | McGowan | H04L 65/765 709/248 |
| 10,326,813 B2* | 6/2019 | Gyimesi | H04L 65/612 |
| 2009/0276813 A1* | 11/2009 | Bleiweiss | H04N 19/152 725/82 |
| 2011/0199304 A1* | 8/2011 | Walley | G06F 3/0346 345/158 |

(Continued)

*Primary Examiner* — Michael R Telan
(74) *Attorney, Agent, or Firm* — Nicholson De Vos Webster & Elliott LLP

(57) ABSTRACT

Technologies for measuring and controlling live video latency are disclosed. Embodiments capture a live video scene, ingest the live video scene into a live video stream, and encode the live video stream with data that can be used to compute latency measurements. Embodiments communicate the live video stream to a content distribution network. The live video stream is distributed, directly or indirectly by the content distribution network, to one or more user systems. The one or more user systems present the live video stream to one or more users. Embodiments determine a latency of the live video stream based on, for example, a measurement that is obtained during the capturing of the live video stream and another measurement that is obtained during or in response to the presenting of the live video stream to the one or more users.

22 Claims, 7 Drawing Sheets

(56) References Cited

U.S. PATENT DOCUMENTS

| | | | |
|---|---|---|---|
| 2012/0284490 A1* | 11/2012 | Ramaswamy | G06F 11/3037 |
| | | | 712/E9.028 |
| 2013/0107786 A1* | 5/2013 | Lotfallah | H04L 65/1083 |
| | | | 370/312 |
| 2013/0173742 A1* | 7/2013 | Thomas | H04L 65/762 |
| | | | 709/217 |
| 2014/0201769 A1* | 7/2014 | Neumeier | H04N 5/765 |
| | | | 725/14 |
| 2017/0251040 A1* | 8/2017 | Archambault | H04N 21/43076 |
| 2017/0272487 A1* | 9/2017 | Lawrence | H04W 4/80 |
| 2020/0037041 A1* | 1/2020 | Tajiri | H04N 21/845 |
| 2021/0037276 A1* | 2/2021 | Giladi | H04N 21/2187 |
| 2022/0391977 A1* | 12/2022 | Jaffar | G06F 11/327 |

\* cited by examiner

LIVE VIDEO LATENCY MEASUREMENT AND CONTROL

RELATED APPLICATIONS

This application claims the benefit of U.S. Provisional Application No. 63/252,578, filed Oct. 5, 2021, which is hereby incorporated by reference.

TECHNICAL FIELD

The present disclosure generally relates to live video latency, and more specifically, relates to measuring and controlling live video latency from video capture to network distribution of the live video.

BACKGROUND

Existing media systems require live video latency to be calculated manually. For example, some existing systems record a visual display of time information that is captured on camera in the live video (e.g., a video of a clock ticking) to determine latency.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
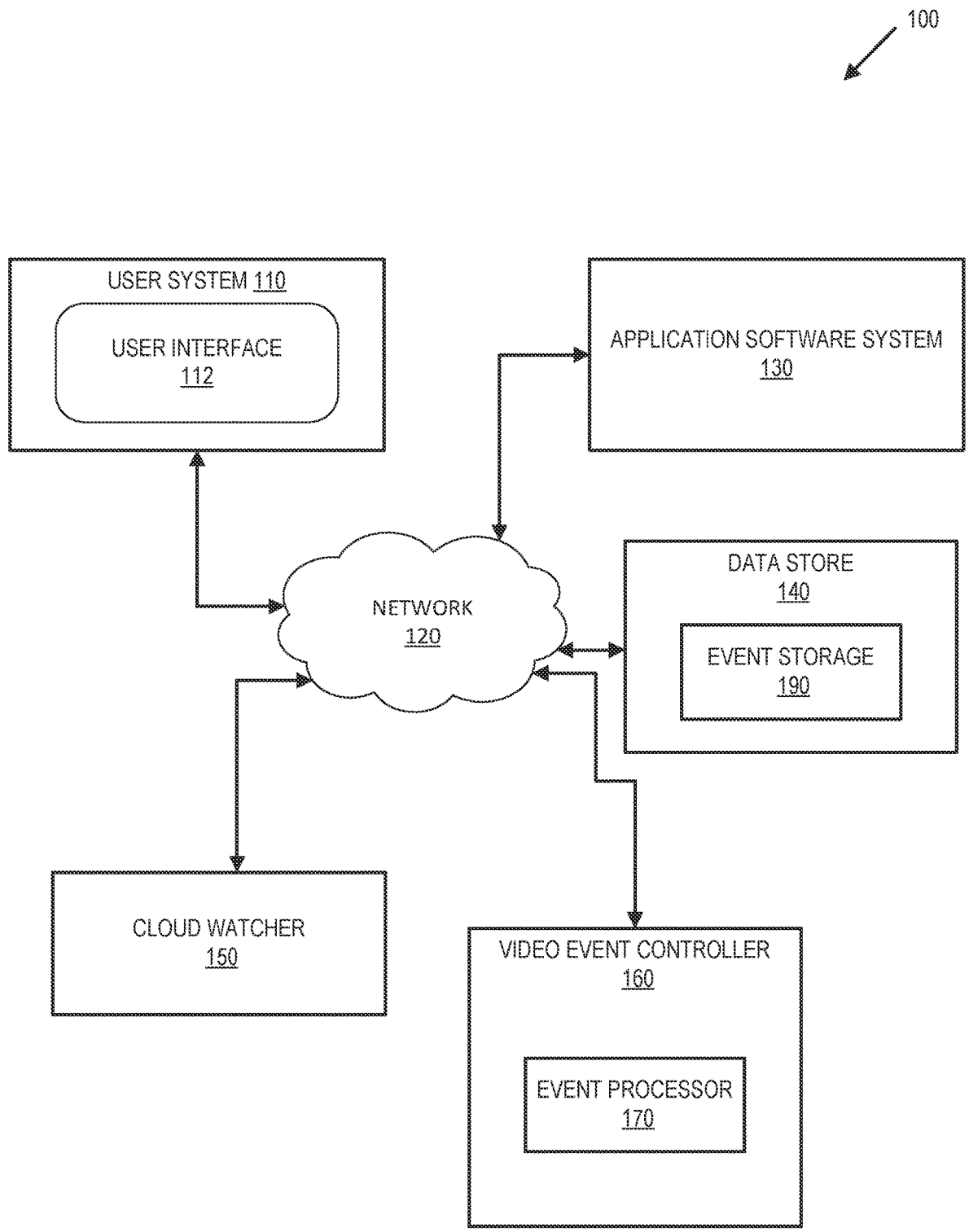
FIG. 1 illustrates a computing system that includes a cloud watcher and video event controller in accordance with some embodiments of the present disclosure.

Aspects of the present disclosure are directed to measuring and controlling a latency of a network-based transmission of a live video segment and providing dynamic distribution of the live video in real-time.

As used herein, "real-time" includes an amount of elapsed time from capture of a live video segment at a first endpoint device through transmission of the live video over a network and rendering of the live video segment at a second endpoint device. In some contexts, real-time can include near real-time, such as real-time adjusted by a delay of a runtime software application that captures, transmits, and/or receives a live video.

Capturing live video at a first or source endpoint and transmitting the live video stream from the first endpoint device to one or more other or destination endpoint devices over a network involves a number of different stages, which can be referred to collectively as a pipeline. For example, a live video transmission pipeline includes at least a video capture stage, a network transmission stage, a content distribution stage, and a rendering stage. As used herein, pipeline can be used to refer to the sequence of stages of processing a live video stream from a source endpoint to a particular one or more destination endpoints.

Live video is a type of multimedia that is ingested, processed, served, and rendered in a continuous manner in real time, with little or no intermediate storage in network devices. Due to the real-time and continuous nature of content delivery, a live video streaming pipeline can incur latency between a source camera and a destination presentation screen. Determining an end-to-end latency as well as intermediate component latencies provides a means of identifying potential latency increasing stages in the pipeline and can help determine end user systems that are causing undesirable latency during the transmission, based on a device type, software version, and/or other factors.

Distributing live video streams to a diverse set of device types, wide geographic areas, and a high number of destination devices presents challenges of scale both in controlling and measuring end-to-end latency of the live video stream. As the quantity of live video streams distributed over a network increases, controlling live video latency across a wide variety of user systems becomes increasingly challenging. Traditional approaches to measuring video latency lack precision because they are based on inspection of visual information that is captured in the live video stream such as an out of frame clock time. Additionally, prior approaches cannot determine latency measurements that are specific to each stage of the live video transmission pipeline.

Aspects of the present disclosure address the above and other deficiencies of prior systems by providing a method for measuring and controlling a live video stream. For example, aspects of this disclosure provide live video latency monitoring that does not require visual inspection of the live video stream. An advantage of the disclosed approaches is that hardware and/or software configurations within a live video transmission pipeline can be adjusted, dynamically if needed, to control latency at one or more stages of the pipeline and/or to control the end-to-end latency.

In addition, aspects of the present disclosure measure and control live video latency accurately at each stage from ingestion at a first device to rendering at one or more second devices. Aspects perform the latency measurements at large scale in real-time. Aspects capture the latency experienced by the viewers at individual destination devices for every live stream. For example, aspects separately measure the latency at each different instance of a live video streaming pipeline, where an instance of a pipeline is between a source of the live video stream and one particular destination device. Additionally or alternatively, aspects determine latency measurements at every stage of the pipeline.

Turning now to the figures, FIG. 1 illustrates an example of a computing system 100 that includes a cloud watcher 150 and a video event controller 160 in accordance with some embodiments of the present disclosure. Computing system 100 includes a user system 110, a network 120, an application software system 130, a data store 140, the cloud watcher 150, and the video event controller 160.

User system 110 includes at least one computing device, such as a personal computing device, a server, a mobile computing device, or a smart appliance. User system 110 includes at least one software application, including a user interface 112, installed on or accessible by a network to a computing device. For example, user interface 112 can be or include a front-end portion of application software system 130.

User interface 112 is any type of user interface as described above. User interface 112 can be used to input search queries and view or otherwise perceive output that includes data produced by application software system 130. For example, user interface 112 includes a graphical user interface and/or a conversational voice/speech interface that includes a mechanism for entering a search query and viewing query results and/or other digital content. Examples of user interface 112 include web browsers, command line interfaces, and mobile apps. User interface 112 as used herein includes application programming interfaces (APIs). In some embodiments, the user interface 112 is configured to receive input from a user and present data to the user. In some embodiments, the user interface 112 is configured to receive input from a user and present data to the user. The user interface 112 receives inputs, such as from a user input device (not shown). For example, the user interface 112 presents data to the user requesting input, such as a moderation action. The user interface 112 presents various media elements to the user including audio, video, image, haptic, or other media data.

The user interface 112 captures input, such as from a user input device such as a touchscreen and/or a video camera coupled to or embedded in the user system 110. For example, the user interface 112 includes an interactive user interface control by which a user of the device can start and stop a live video capture. The user interface 112 also presents data to the user, such as a notification that the user system 112 has started or stopped capturing live video. The user interface 112 presents various media elements to the user including audio, video, image, haptic, or other media data.

Data store 140 is a memory storage. Data store 140 stores cached multimedia (e.g., video, audio data, or a combination of both). Data store 140 can reside on at least one persistent and/or volatile storage device that can reside within the same local network as at least one other device of computing system 100 and/or in a network that is remote relative to at least one other device of computing system 100. Thus, although depicted as being included in computing system 100, portions of data store 140 can be part of cloud watcher 150 or video event controller 160 or accessed by computing system 100 over a network, such as network 120. For example, data store 140 can be part of a data storage system that includes multiple different types of data storage and/or a distributed data service. As used herein, data service refers to a physical, geographic grouping of machines, a logical grouping of machines, or a single machine. For example, a data service can be a data center, a cluster, a group of clusters, or a single machine.

Application software system 130 is any type of application software system that includes or utilizes functionality provided by cloud watcher 150 or video event controller 160. Examples of application software system 130 include but are not limited to live video event broadcasting services, live video event streaming systems, connections network software that has live video functionality, such as social media platforms, and systems that are or are not be based on connections network software, such as general-purpose search engines, video livestreaming software, video conferencing software, job search software, recruiter search software, sales assistance software, advertising software, learning and education software, or any combination of any of the foregoing.

While not specifically shown, it should be understood that any of user system 110, application software system 130, data store 140, cloud watcher 150, and video event controller 160 can include an interface embodied as computer programming code stored in computer memory that when executed causes a computing device to enable bidirectional communication with any other of user system 110, application software system 130, data store 140, cloud watcher 150, and video event controller 160 using a communicative coupling mechanism. Examples of communicative coupling mechanisms include network interfaces, inter-process communication (IPC) interfaces and application program interfaces (APIs).

A client portion of application software system 130 can operate in user system 110, for example as a plugin or widget in a graphical user interface of a software application or as a web browser executing user interface 112. In an embodiment, a web browser can transmit an HTTP request over a network (e.g., the Internet) in response to user input that is received through a user interface provided by the web application and displayed through the web browser. A server running application software system 130 and/or a server portion of application software system 130 can receive the input, perform at least one operation using the input, and return output using an HTTP response that the web browser receives and processes.

Each of user system 110, application software system 130, data store 140, cloud watcher 150, and video event controller 160 is implemented using at least one computing device that is communicatively coupled to electronic communications network 120. Any of user system 110, application software system 130, data store 140, cloud watcher 150, and video event controller 160 can be bidirectionally communicatively coupled by network 120. User system 110 as well as one or more different user systems (not shown) can be bidirectionally communicatively coupled to application software system 130.

A typical user of user system 110 can be an administrator or end user of application software system 130, cloud watcher 150, and/or video event controller 160. User system 110 is configured to communicate bidirectionally with any of application software system 130, data store 140, cloud watcher 150, and/or video event controller 160 over network 120.

The features and functionality of user system 110, application software system 130, data store 140, cloud watcher 150, and video event controller 160 are implemented using computer software, hardware, or software and hardware, and can include combinations of automated functionality, data structures, and digital data, which are represented schematically in the figures. User system 110, application software system 130, data store 140, cloud watcher 150, and video event controller 160 are shown as separate elements in FIG. 1 for ease of discussion but the illustration is not meant to imply that separation of these elements is required. The illustrated systems, services, and data stores (or their functionality) can be divided over any number of physical systems, including a single physical computer system, and can communicate with each other in any appropriate manner.

Network 120 can be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

Figure 5:
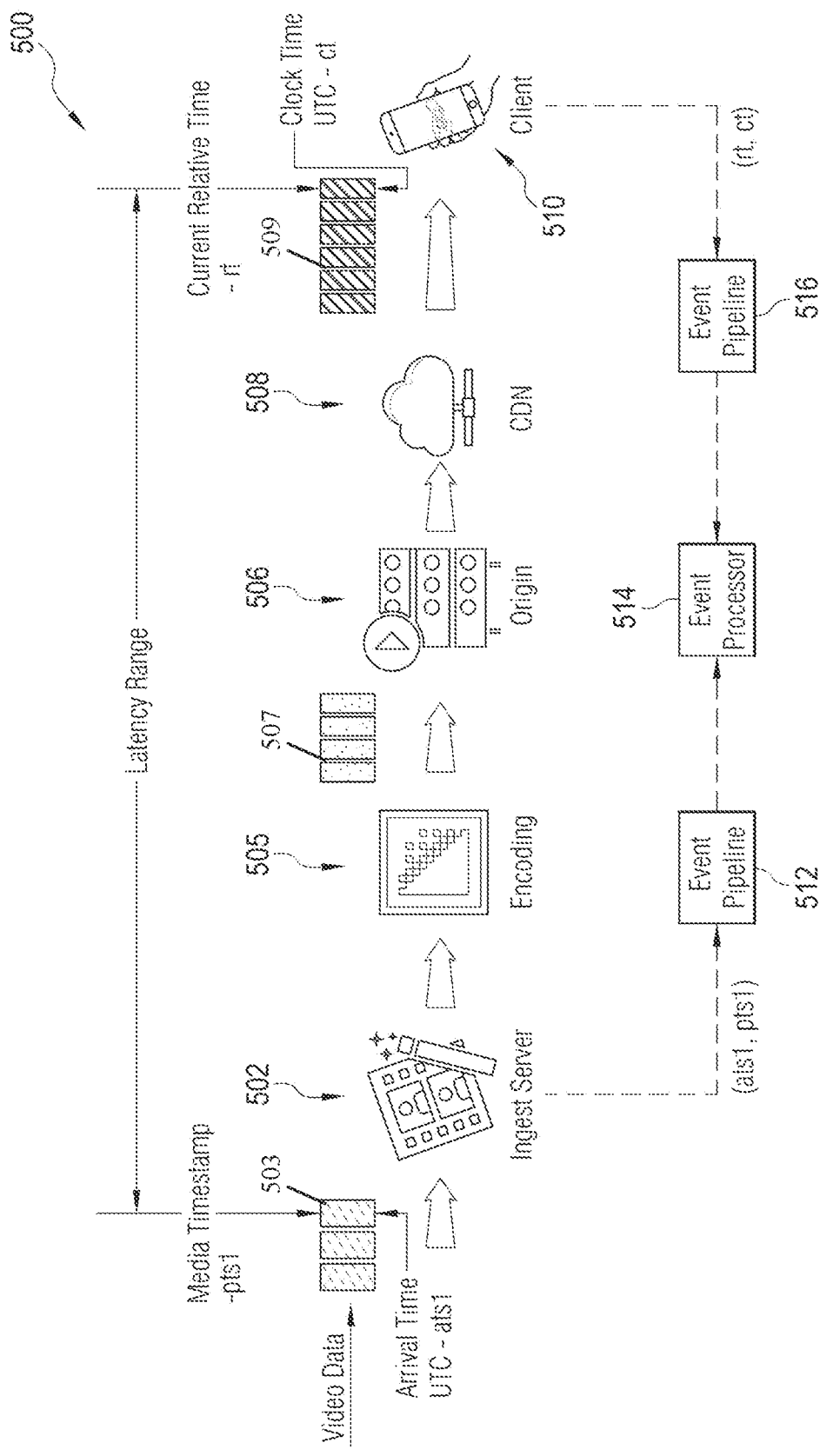
FIG. 5 is an example of a method for measuring and controlling latency of a live video stream from video capture at a first device to rendering of the live video at a second device, according to aspects of the present disclosure. For instance, the computing system applies a timestamp at the arrival time (e.g., video capture time).

The computing system 100 includes a cloud watcher 150 that provides, e.g., event notification data and/or video parameter data to the video event controller 160. As shown in FIG. 5, the cloud watcher 150 can be implemented as instructions stored in a memory, and a processing device such as ingestion server 502 can be configured to execute the instructions stored in the memory to perform the operations described herein.

The cloud watcher 150 monitors one or more metrics of a live video stream, during the transmission of the live video stream from a source device to one or more destination devices. The cloud watcher 150 can be provided as a cloud service or executed on either of user system 110 or the computing device executing the video event controller 160. The cloud watcher 150 receives the live video stream from a content server (e.g., an origin server or a content distribution network) and computes a latency measurement from the time of video capture at a first or source device to a render time of presentation of the live video stream to user at a second device.

The cloud watcher 150 simulates performance of any number of user systems and parameters to monitor the latency within the pipeline. For instance, the cloud watcher determines that a particular type of user system, such as a particular hardware and/or software configuration, presents a greater latency than other user systems, or that a specific geographic location at which a user system is receiving the live video stream yields a greater latency. The cloud watcher 150 provides various parameter values to the video event controller 160 as feedback or alternatively, the video event controller 160 monitors feedback of the cloud watcher 150. The cloud watcher 150 measures and monitors trend information relating to the latency between the arrival time of a video segment at an ingestion server and an arrival time of the video segment at the cloud watcher 150. In one example, the arrival time at the ingestion server is a current clock time tracked by a software application or a network device in the computing system 100, such as the ingestion server. The cloud watcher 150 computes an estimated render time for each combination of a type of user system 110, a video presentation application executed by the user system 110, and a network connection of the user system 110. The cloud watcher 150 initiates an alert to the video event controller 160 for latency that is greater than a threshold latency, for an increasing latency trend, or for other latency parameters.

The video event controller 160 can perform aspects of a live video stream processing, such as those discussed with respect to at least FIGS. 2-7. The video event controller 160 can be implemented as a software application or as specialized hardware. In some embodiments, the application software system 130 includes at least a portion of the video event controller 160.

In operation, a user system 110 captures a live video stream. The video event controller 160 receives the live video stream from the user system 110 that captured the live video scene. In one example, the video event controller 160 encodes the live video stream and transmits the live video stream to a content distribution network using, e.g., a network interface.

The video event controller 160 includes an event processor 170. Event processor 170 receives events from the cloud watcher 150, the user system 110, and/or other devices. The event processor 170 analyzes events received from various devices in the video segment pipeline. For instance, the event processor 170 generates and sends a notification to video event controller 160, where the event notification indicates that a particular video segment has been processed at a particular device that generated the event. The event processor 170 receives processing events (e.g., live video transmission events that occur on the processing pipeline prior to the origin server) and presentation events (e.g., live video transmission events that occur on or in connection with a user system after the origin server) based on a stage from which the event was received. The video event controller 160 determines a latency measurement based on a comparison of multiple events received by the event processor 170 during the video segment pipeline.

The video event controller 160 receives one or more latency metrics from the cloud watcher 150. The video event controller 160 dynamically adjusts a network routing of the live stream based on one or more latency metrics computed by and received from the cloud watcher 150, in some embodiments. For example, the video event controller 160 is capable of determining, based on the latency metrics computed by cloud watcher 150, that a particular component of a particular stage of the live video transmission pipeline is increasing the latency of the live video stream.

In response to determining that latency is increasing at a particular component of the pipeline, the video event controller 160 adjusts the routing of the live video stream to remove the particular component causing the increased latency and inserts another component into the pipeline to perform the same or similar function with a lower latency. As used herein, a component that contributes to increased latency at one or more stages of the pipeline can be referred to as a latent component. For instance, the video event controller 160 determines that a first content distribution network is latent because it contributes 70% of the end-to-end latency. The video event controller 160 removes the latent component, e.g., the first content distribution network, from the network routing and inserts a second content distribution network into the pipeline in place of the first content distribution network.

In another example, the video event controller 160 determines that a particular type of user system, e.g., a particular device type, hardware, operating system, or software platform, is a latent component. The video event controller 160 identifies a particular type of user system as a latent component based on a comparison of a first measured latency for a first group of user systems of a first type to a second measured latency for second group of user systems of a second type that is different than the first type. For example, the comparison indicates that the first measured latency is greater than the second measured latency by a threshold amount. The video event controller 160 notifies a user of a latent user system that the latent user system is increasing the latency of the live video stream.

The video event controller determines in real-time, based on the feedback from the cloud watcher, various contributing factors to the end-to-end latency (e.g., pipeline delay). For instance, the video event controller 160 determines that a specific model of device, software, streaming application, network connection and/or other factors are impacting the latency of the system. The video event controller 160 triggers a notification to any number of user systems with a recommended adjustment to reduce the latency of the live video stream. Examples of notifications that can be triggered by the video event controller 160 include but are not limited to: "connect to Wi-Fi," "upgrade the software on the client device," or "upgrade or change devices." In some embodiments, the video event controller clusters groups of user systems (e.g., attendees at a conference) and generate notifications based on aggregated group metrics such as an average latency among similar users, similar devices, or similar locations.

In another aspect, the video event controller 160 provides latency notifications to a user of a video capture user system 110 that is capturing the live video stream. For instance, the video event controller 160 notifies a user of a video capture user system 110 that the end-to-end latency of the live video stream is greater than a threshold end-to-end latency value or that a particular group of user systems has a latency that is increasing. The video event controller 160 computes latency metrics using the measure latency values and provide a user of a video capture user system 110 with real-time feedback, such as a display of latency metrics, a graph of latency metrics, or the like.

Figure 2:
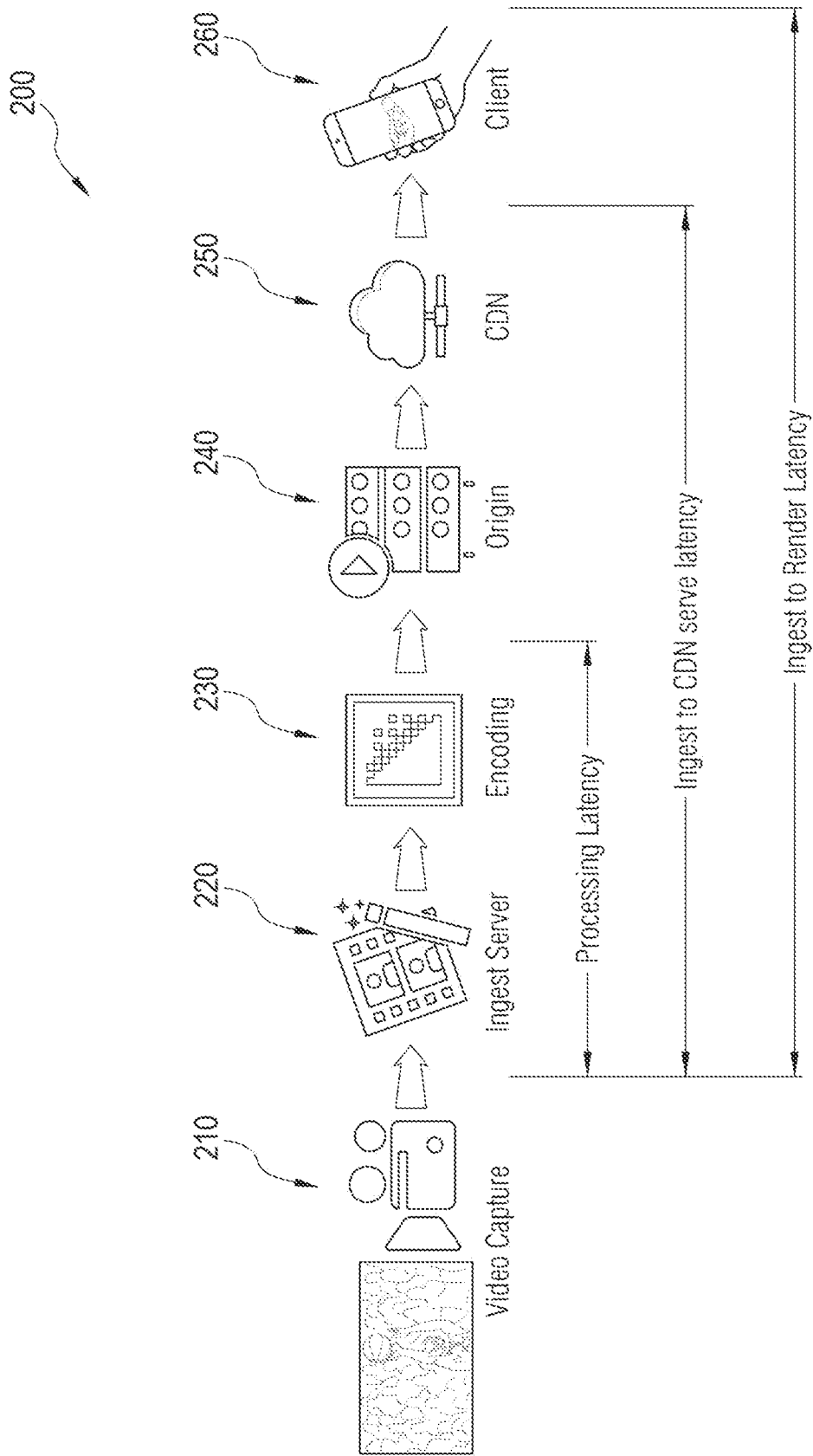
FIG. 2 is a flow diagram of an example method for measuring and controlling live video latency in accordance with some embodiments of the present disclosure.

FIG. 2 is a flow diagram of an example method 200 of measuring and controlling live video latency in accordance with some embodiments of the present disclosure.

The method 200 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the video event controller of FIG. 1.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. In some embodiments, the processes described with regard to FIG. 2 can be performed by the video event controller, the application software system, or a combination of both the video event controller and the application software system.

At block 210, the method 200 includes a processing device capturing a video signal, which depicts a live scene such as a person giving a presentation, a live sporting event, a live news event, a live performance, or another type of live event. For example, a user system captures a video scene using a communicatively coupled camera or a camera integrated into the user system. A live video scene includes, for example, video footage, audio, text overlays such as subtitles or closed captions, graphical overlays such as augmented reality elements, or any combination of any of the foregoing and/or other visual and/or audio elements. The user system is capable of capturing audio and video scenes concurrently using a combination of different video and audio capture devices, in some embodiments. In some examples, the user system captures video and/or audio received from another computing system such as a wirelessly coupled camera or audio sensor.

At block 220, the method 200 includes a processing device ingesting the live video scene captured at block 210 into an electronic media format. For instance, an ingestion server or video event controller transfers the live video scene into a digital electronic storage format such as dividing the live video scene into live video segments that are suitable for communication using network interface devices. The ingestion server ingests partial media segments that are a portion of the total live video segment length, in some embodiments. A segment length is determined based on the particular ingestion technology, hardware platform or software used to ingest the live video. For example, a segment length is 2 seconds, 4 seconds, or 6 seconds, in some embodiments. A timestamp indicating the arrival of the live video scene at the ingestion server is created. The video event controller can include the timestamp information during the encoding at block 230 as described below.

At block 230, the method 200 includes a processing device encoding the live video scene ingested at block 220 into a live video stream. For example, embodiments of the video event controller include an encoder that converts an analog or digital video signal (or audio/visual signal) into an electronic file including one or more video segments. The live video scene is ingested using, for example, encoding technologies such as Hypertext Transfer Protocol Live Streaming (HLS), Real-Time Messaging Protocol (RTMP), or the like. In some embodiments, the ingestion of the live video scene includes performing compression, noise filtering, and other pre-processing operations. The video event controller includes the timestamp by manipulating a header file or otherwise adding the timestamp into the metadata of the one or more video segments.

Processing latency as shown in FIG. 2 refers to the time elapsed between receipt of the live video stream at block 220 and the completion of the encoding performed at block 230. Processing latency is an example of one of the types of latency measurements that can be computed using the disclosed technologies.

At block 240, the method 200 includes a processing device communicating the live video stream produced at block 230 to one or more content distribution networks. After the live video stream is encoded, the video event controller transmits the live video stream to the content distribution networks using a network interface. For example, embodiments of the video event controller transmit a sequence of video segments to one or more content distribution networks using a load balancer that is configured based on a current number of user systems connected to each of the content distribution networks. The video event controller also or alternatively allocates the live video stream to different content distribution networks based on historical performance of each of the content distribution networks regarding the latency of the live video stream as measured using the technologies described herein.

In one example, an "origin" server is a computing system that is the original source of the live video stream, which transmits the live video stream to one or more user systems either directly or indirectly through a content distribution network. While live video content can be available on the origin servers, a content distribution network is generally a more scalable distribution network. In some aspects, the video event controller dynamically determines or dynamically modifies the number of content distribution networks to which the live video stream is communicated based on latency measurements that are computed and provided using the techniques described herein. Alternatively, or in addition, the video event controller adjusts the hardware and/or software configurations of one or more particular content distribution networks based on latency metrics that are computed and produced by the disclosed technologies for each of the one or more particular content distribution networks.

At block 250, the method 200 involves distributing, by the one or more content distribution networks, the live video stream communicated to the one or more content distribution networks at block 240. The one or more content distribution networks distributes the live video stream to one or more, or typically a large number, of user systems. The content distribution networks receive content requests from any number of user systems. For example, in response to a content request received by the content distribution network from a particular user system, a content distribution network identifies one or more routing servers (e.g., edge routing servers) in the path between the content distribution network and the requesting user system.

Ingest to CDN serve latency as shown in FIG. 2 refers to the time elapsed between ingestion of the live video stream at block 220 and the serving of the live video stream by CDN at block 250. Ingest to CDN serve latency is an example of one of the types of latency measurements that can be computed using the disclosed technologies.

In the example of FIG. 1, the cloud watcher 150 monitors the live video stream and generates one or more metrics based on latency measurements, e.g., processing latency, ingest to CDN serve latency, and/or ingest to render latency, produced using the disclosed approaches. The cloud watcher 150 monitors and measures one or more latencies of the live video stream as it is received by the content distribution networks. The cloud watcher 150 generates a timestamp of the live video stream at each of the content distribution networks. The cloud watcher 150 ranks the content distribution networks based on the latency measured between the video capture and each of the content distribution networks (e.g., the ingest to CDN serve latency measurements for different CDNs). In some embodiments, one or more instances of the cloud watcher 150 are configured to receive the live video stream directly from the origin server.

At block 260, the method of 200 includes a processing device presenting the live video stream to a user of the user system. The user system presents the live video stream to the user on a screen of a user interface 112, for example. The user system retransmits the live video stream to, for example, an external video display or a projection system, in some embodiments.

Ingest to render latency as shown in FIG. 2 refers to the time elapsed between ingestion of the live video stream at block 220 and the rendering of the live video stream at a user device, at block 260. Ingest to render latency is an example of one of the types of latency measurements that can be computed using the disclosed technologies.

In some embodiments, the user system causes additional latency between an arrival time of the live video stream at the user system and a presentation time at which the user system presents the live video stream onto a screen or other presentation device to the user (e.g., the ingest to render latency). The cloud watcher 150 is configured to simulate rendering time for any number of devices and/or video playback applications, in some embodiments. For example, the cloud watcher 150 computes rendering time for a combination of user system and software application. The cloud watcher 150 determines an estimated ingest to render latency by combining the additional latency from the computed render time with the latency prior to rendering.

In other embodiments, an instance of the cloud watcher 150 communicates directly with the user system to compute rendering latency metrics. In some embodiments, an instance of cloud watcher 150 is executed as a monitoring application on the user system. In an example in which the cloud watcher 150 communicates directly with the user system, the cloud watcher 150 requests a current playback timestamp of the live video stream and the current system time of the user system at various time intervals during the live video stream.

Figure 3:
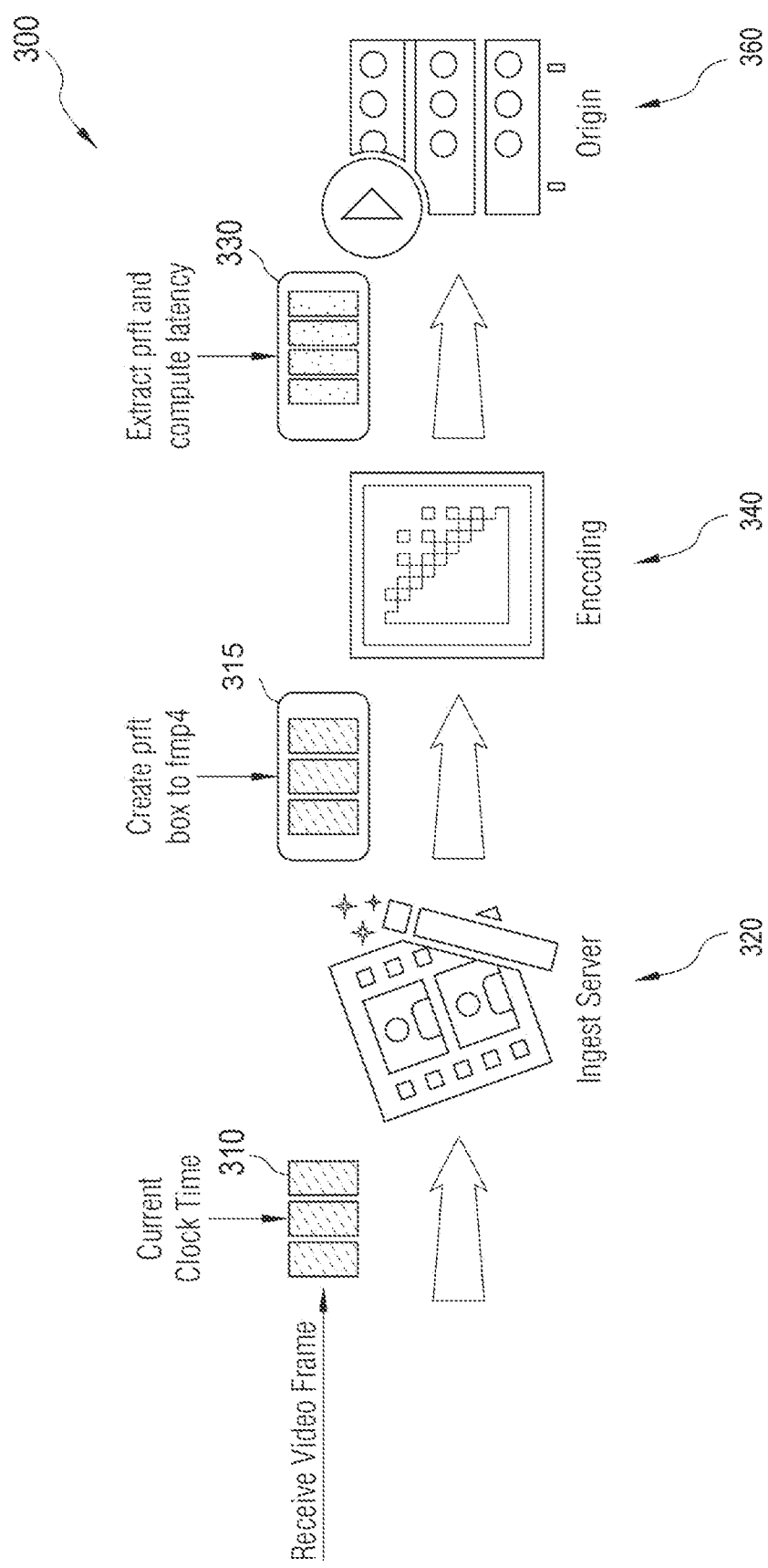
FIG. 3 is an example of a method for measuring latency of a live video stream from video capture at a first device to an origin server, according to aspects of the present disclosure.

FIG. 3 is an example of a method for measuring latency of a live video stream from video capture at a first device to an origin server, according to aspects of the present disclosure. In general, the latency between an ingestion server and an origin server is known as processing pipeline latency. Processing pipeline latency as used herein refers to a timeframe between a first time (e.g., first timestamp) at which the video segment is received by the ingestion server and a second time (e.g., second timestamp) at which the video segment is stored in the blob storage of the ingestion server or video event controller 160. The video event controller uses the processing pipeline latency to, for example, identify potential issues in the pipeline, such as a component degradation, failure, or another system health metric. Although the ingest server 320, the encoding technologies 340, and the origin server 360 are depicted as separate components, all or a portion of these components can be included in the video event controller, the application software system, or a combination of both.

The method 300 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the video event controller of FIG. 1.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. In some embodiments, the processes described with regard to FIG. 3 can be performed by the video event controller, the application software system, or a combination of both the video event controller and the application software system.

In the example of FIG. 3, a video segment 310 is received by the ingest server 320. The video event controller inserts a current clock time by annotating metadata, such as by manipulating a header of the video segment 310 of one or more video frames of the video segment with an ingestion time (i.e., arrival time) for each video segment as it is received by the ingest server 320 as described at block 220. For instance, the ingestion server transfers the video segment into one or more fragmented video segments (e.g., .fmp3) that are suitable for communication using network interface devices. The video segment size is determined based on the particular hardware platform and/or the particular software used to ingest the live video, transmit the live video across one or more networks, or to present the video segment on the user system. In some embodiments, the ingestion server is a component of the video event controller 160. In other embodiments, one or more functions of the ingestion server is provided by the application software system 130.

The video event controller 160 creates a Producer Reference Time Box (PRFT) 315. A PRFT indicates a clock time at which a video segment (or video frame) is produced. The video event controller 160 fragments a video segment with a common PRFT 315, such as by generating a fragmented mp4 from the video segment and assigning a different PRFT value to each of the fragments of the video segment. The video event controller uses, for example a local system clock time at the geographic location or time zone of the video event controller 160 for the time of the PRFT.

The video event controller 160 applies encoding technologies 340 to each fragmented video segment similar to the encoding process discussed above. The video event controller 160 provides the encoded video segment 330 to the origin server 360. The video event controller 160 extracts the PRFT at the origin server 360 and computes the latency from the time at which the captured video segment is received at the ingestion server to the time at which the encoded video segment 330 is received at the origin server 360.

The video event controller extracts the PRFT from the encoded video segment 330 when the encoded video segment 330 is received by the origin server 360. The video event controller computes a latency for each video frame of the encoded video segment 330 by comparing a time indicated by the PRFT (i.e., ingestion time) and the current time wall (clock time or system time) at the origin server. In some embodiments, the ingestion server generates a heartbeat event that is used throughout the live video streaming pipeline to provide a common reference time for the ingestion server, encoder, origin server, and other devices. An example of a heartbeat is a periodically generated and broadcasted signal that contains a clock time, such as a system clock time of the ingestion server, which is used in determining latency measurements across the devices in the live video stream pipeline.

In some embodiments, the video event controller 160 performs diagnostics of the live video stream pipeline based on the latency computed from the ingestion server to the origin server. Examples of diagnostics that can be performed by the video event controller 160 include determining that a particular component of the live video stream pipeline is failing, and determining that a particular component of the live video stream pipeline is not performing according to a required standard. The video event controller 160 dynamically updates a particular routing path for the live video stream pipeline in response to determining that the latency of a particular component is greater than a threshold level. For example, a threshold level latency is an amount of latency that degrades the live video stream to an extent that is detectable by a user viewing the live video stream. The threshold level latency can be determined by experimentation and can vary according to the requirements of a particular design or implementation of the system. In some embodiments, the video event controller generates a notification for a user of the video event controller, such as a user that has an administrative or developer role, which contains an indication that the latency in the processing pipeline is greater than the threshold level. In some embodiments, the notification includes a summary of the pipeline routing adjustments.

Figure 4:
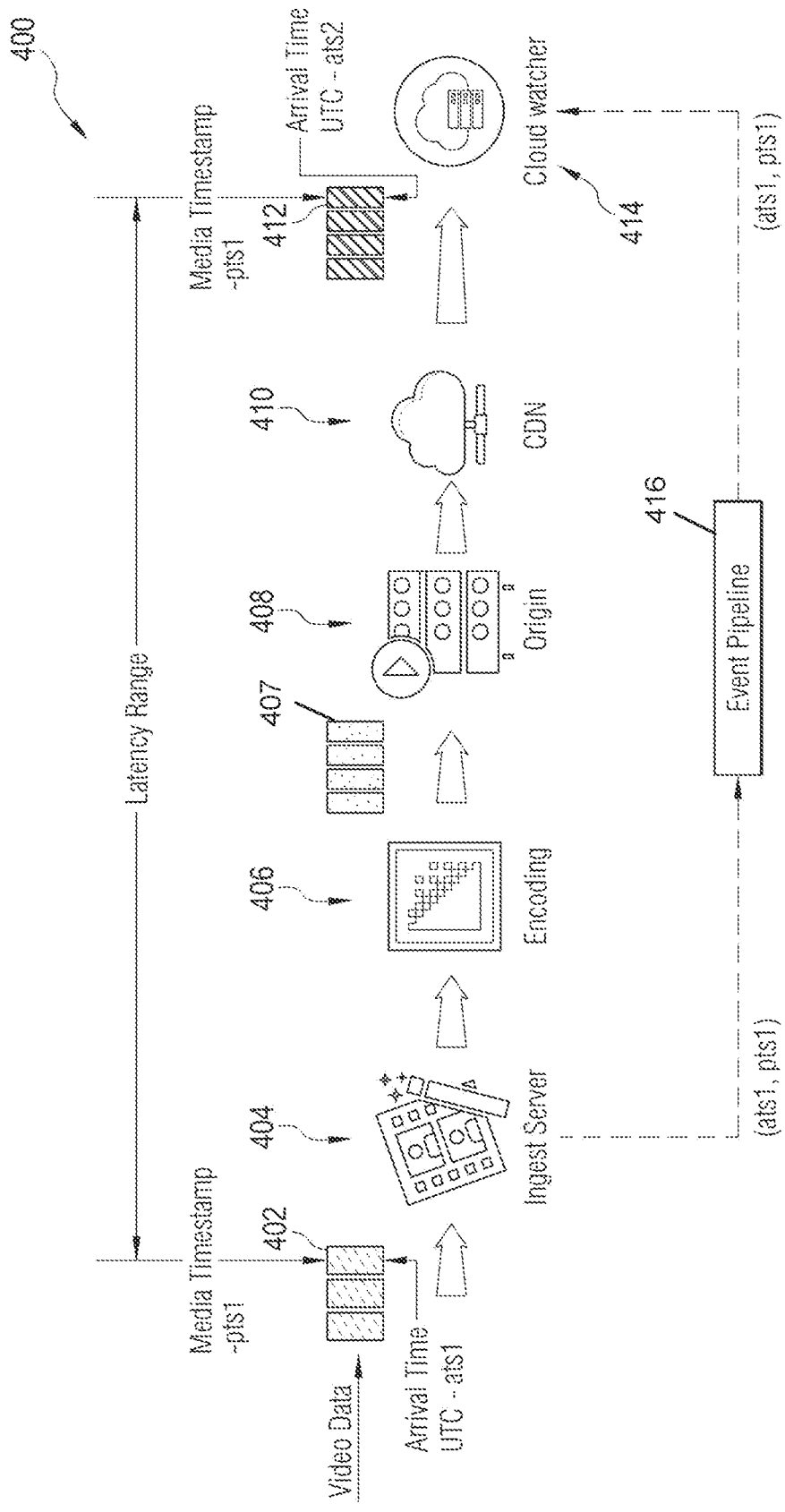
FIG. 4 is example of a method for controlling latency of a live video stream from video capture at a first device to content service at a second device, according to aspects of the present disclosure.

FIG. 4 is example of a method for controlling latency of a live video stream from video capture at a first device to content service at a second device, according to aspects of the present disclosure. As described above, the video event controller measures the latency by applying a time code and a PRFT and then compares the PRFT with other times throughout the live video streaming pipeline. The video event controller 160 analyzes the set of latencies and modifies the routing, processing, and/or other factors in the live video streaming pipeline to achieve a target latency. In some examples, the video event controller 160 sets a target latency for a particular live video stream. For instance, the video event controller 160 sets a higher target latency for a live video stream with a low engagement or interaction level while setting a lower target latency for a live video stream with a high engagement or interaction level. The video event controller 160 also modifies the target latency based on a rate of engagement or interaction as determined by user responses (e.g., interactions with the user systems) to the live video stream.

The method 400 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the video event controller of FIG. 1.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. In some embodiments, the processes described with regard to FIG. 4 can be performed by the video event controller, the application software system, or a combination of both the video event controller and the application software system.

As illustrated by FIG. 4, a video segment 402 is captured by a camera and received at an ingestion server 404. The ingestion server 404 initiates an event such as setting a flag, emitting a status, or sending a notification to an event pipeline 416 that includes one or more timestamps associated with the video segment 402. An example of the event pipeline 416 is a set of events associated with a video segment 402 from the ingestion server 404 to content service on the second device. In one example, the event pipeline 416 includes an arrival time "ats1" and a time stamp "pts1." An example of the arrival time is an actual system clock time of the ingestion server at which the video segment 402 was received. In this example, the timestamp "pts1" is applied based on the arrival time but is not necessarily the actual arrival time. In some embodiments, the arrival time ats1 is a local observed time at the location of the video event controller and the timestamp pts1 is a system time of the ingestion server. The video event controller or the cloud watcher receives the event via the event pipeline 416 from the ingestion server 404. The video event controller or the cloud watcher uses the event pipeline 416 to compute latency at various points of the live video stream pipeline. The video event controller stores one or more events or the event pipeline for each video segment 402 in the data store, as described above. In some examples, the local observed time and the system time are the same time, however, clock times can vary based on the timekeeping mechanism, gravity, and other factors.

As described above, the video event controller creates a PRFT for the video segment 402 and applies encoding technologies 406 to each video segment similar to the encoding process as discussed above. The video event controller provides the encoded video segment 407 to the origin server 408. The video segment 402 is transmitted from the origin server 408 to one or more content distribution networks (CDNs) 410. The CDN is, in some embodiments, a geographically distributed network of proxy servers and an associated data center. The CDN provides scalability for the distribution of live video content to a large number of user systems across a potentially worldwide network. For example, a CDN can adjust a number of servers allocated to the distribution of a live video stream based on network traffic, load balancing, and/or other factors.

The one or more CDNs 410 serve the video segment 402 to multiple user systems. While CDNs often improve availability of live video content across a large network, the latency characteristics can vary widely across different CDNs. To address this challenge, embodiments of the cloud watcher 414 are implemented on a user system or another streaming device that receives the video segment from the CDNs. Implementation of a cloud watcher 414 on a recipient/destination device provides a more robust computation of the latency measurements downstream of the CDN as well as the measurements of latency contributed by each individual CDN.

As illustrated by FIG. 4, the video segment is communicated by the content distribution network 410 to the cloud watcher 414. For instance, the cloud watcher 414 simulates a user system receiving the video segment 402. The cloud watcher 414 compares the time stamp and arrival time of the event received from the ingestion server to the time stamp and arrival time of the received video segment. The cloud watcher computes the live video pipeline delay by comparing the arrival time received in the event (ats1) with the arrival time of the video segment at the cloud watcher 414 (ats2).

For instance, the cloud watcher computes the pipeline delay by taking a difference of the arrival time at which the video segment arrived at the ingestion server (ats1) and the arrival time at which the video segment arrived at the cloud watcher (ats2). The computation is represented by the equation $P_D = ats_2 - ats_1$, where $P_D$ represents the total pipeline delay, $ats_2$ represents the arrival time at the cloud watcher 414, and $ats_1$ represents the arrival time at the ingestion server. The cloud watcher computes a pipeline offset value by, for example, computing a difference between the time stamp applied by the video event controller at the ingestion server (pts1) and the time stamp at the cloud watcher (pts1'). In some embodiments, the computation of the pipeline offset value is represented by the equation $P_O = pts_1' \Delta pts_1$, where $P_O$ represents the pipeline offset, $pts_1'$ represents the time stamp at the cloud watcher 414, and $pts_1$ represents the time stamp at the ingestion server. The cloud watcher 414 computes the total latency by taking the difference between the pipeline delay and the pipeline offset. The computation is represented by, for example, the equation $L = P_D - P_O$, where L represents the total latency, $P_D$ represents the total pipeline delay, and $P_O$ represents the pipeline offset.

The cloud watcher 414 communicates feedback to the video event controller. Examples of feedback include the latency, a trend of the latency, or other metrics that indicate a measurement of a system's health in terms of live video latency. In some embodiments, the cloud watcher emulates any number of user systems and parameters to monitor the total latency within the system to include an estimation of the render latency for the emulated user system. For instance, the cloud watcher determines that a particular type of user system is experiencing a greater latency than other devices, or that a specific location at which the user system(s) are receiving the live video stream yields a greater latency. The cloud watcher provides various parameter values to the video event controller as feedback.

The video event controller determines in real-time, based on the feedback from the cloud watcher, various contributing factors to the end-to-end latency (e.g., glass-to-glass delay). For instance, the video event controller determines that a specific model of device, software, streaming application, network connection or other factors are impacting the latency of the system. The video event controller triggers a notification to any number of user systems with a recommended adjustment to reduce the latency of the live video stream. Examples include but are not limited to: "connect to Wi-Fi," "upgrade the software on the client device," or "upgrade or change devices." The video event controller clusters groups of user systems (e.g., attendees at a conference) and generates notifications based on aggregated group metrics such as an average latency among similar users, similar devices, or similar locations.

In some embodiments, the video event controller monitors interactions of users with the user system in response to the live video stream. For instance, the video event controller determines that a particular live video stream is an interactive presentation that involves a presentation including feedback from the user, or input by the user. The video event controller notifies the user system that is capturing the live video scene of latency metrics for user systems receiving the live video stream. The video event controller also notifies the users of user systems receiving the live video stream of the latency specific to their user system. The resulting system provides both the presenter and each audience member an understanding of the latency being experienced across the live video stream and notifies the presenter and audience of how much the inputs will be delayed. Based on these latency notifications, the presentation of the live video stream is modified, either automatically under system control or by user control, to accommodate for latency (e.g., by leaving survey questions open for additional time or extending the wait time for user inputs).

In other embodiments, the video event controller determines that a particular live video stream has low interactivity in terms of feedback in the form of input by the users of the user systems. In response to detecting low interactivity, the video event controller increases the latency of the live video stream. Other reasons for increasing latency include, for example, reducing network costs, optimizing bandwidth allocations, and/or prioritizing reducing latency on other live video streams that have greater interactivity. The video event controller sets a target latency for each live video stream based on a relative level of interaction between the presenter and the audience. In some embodiments, the target latency is set inversely proportional to the level of interaction.

FIG. 5 illustrates an example of measuring and controlling latency of the live video stream, according to aspects of the present disclosure. For instance, embodiments of the computing system apply a timestamp at the arrival time (e.g., video capture time).

The video event controller receives events from the ingestion server 502, the content distribution network 508, the user systems 510, and intermediate devices in the network routing path (e.g., encoding technology 504, origin server 506, etc.). The video event controller includes an event processor 514 that analyzes the received events. For instance, the video event controller receives a signal indicating that a particular video segment, such as video segments 503, 507, and 509, have been processed at the device that generates the event. As depicted in FIG. 5, the video segments 503, 507, and 509 are shaded differently to represent the different stages of processing for each video segment.

The video event controller initializes an event pipeline that includes all of the events associated with the transmission of a particular video segment, such as video segments 503, 507, and 509, from the source device to a particular destination device. In some embodiments, the video event controller initializes processing event pipeline 512 and presentation event pipeline 516 separately, e.g., based on a stage or a device from which the event was received.

In some examples, processing event pipeline 512 and presentation event pipeline 516 are referred to as an "event pipeline." The video event controller determines a latency based on a comparison of the received event (e.g., using the event processor 514) and a previous event within the event pipeline. For example, the video event controller receives a first event from the ingestion server at time $t_1$ and a second event from a user system 510 at time $t_1$. The video event controller includes both times $t_1$ and $t_2$ in the event pipeline for the particular video segment. The video event controller computes a delay based on the difference between $t_1$ and $t_2$. The video event controller combines the delay with a pipeline offset as discussed above to determine a latency for the particular video segment. While not shown, the video event controller receives events and perform latency determinations for each device or stage in the live video stream pipeline. The video event controller selects all or a subset of the events for inclusion in the event pipeline 512. The video event controller determines a live stream health metric based on the latency, a trend of latency over a time interval, or the like. The video event controller adjusts the flow of network routing to reduce the latency of the video segment. The video event controller applies additional metadata to the live video stream or each video segment to determine additional health metrics of the live video stream.

Figure 6:
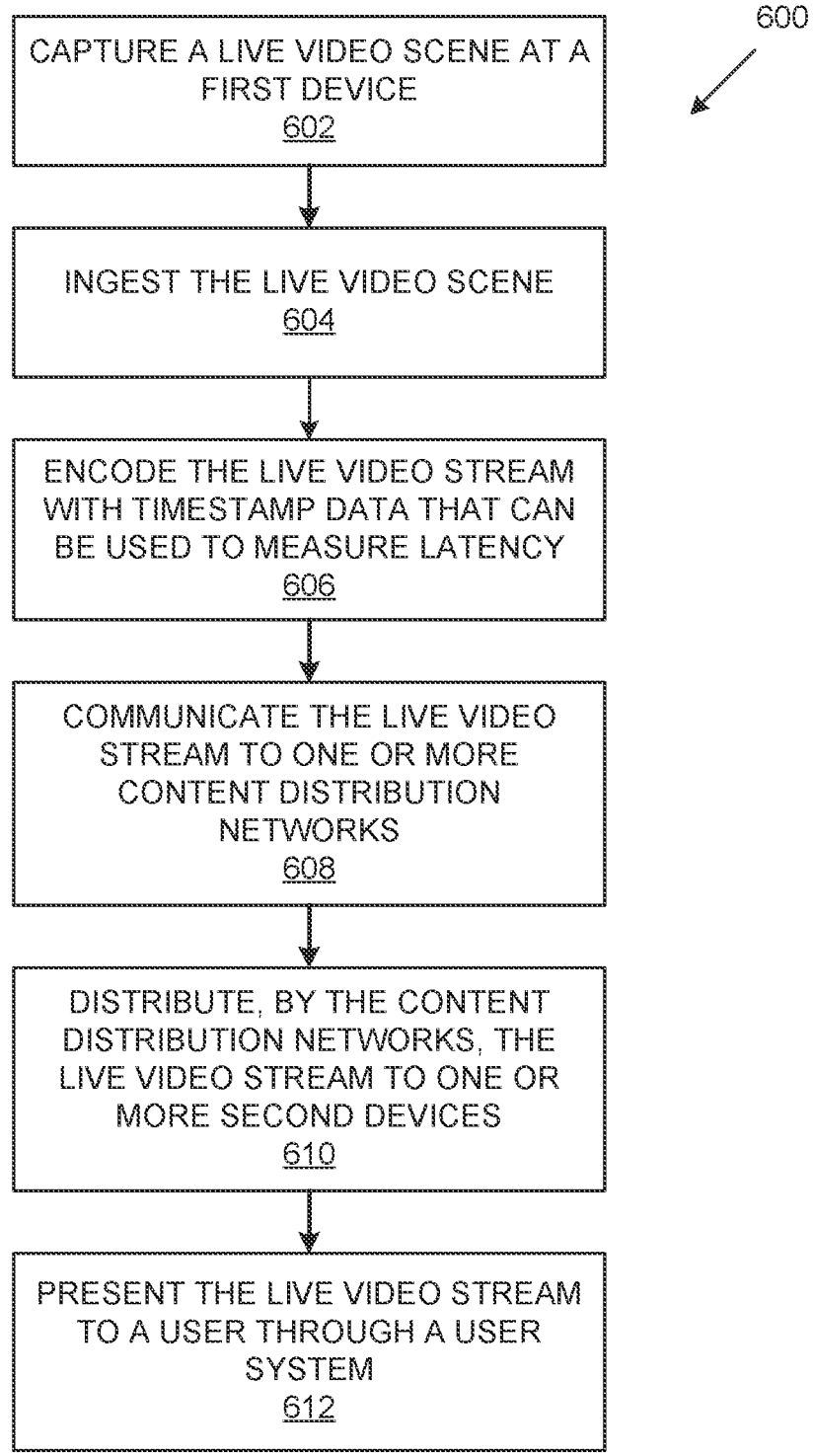
FIG. 6 is a flow diagram of an example method for measuring and controlling live video latency in accordance with some embodiments of the present disclosure.

FIG. 6 is a flow diagram of an example process 600 of measuring and controlling live video latency in accordance with some embodiments of the present disclosure.

The process 600 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the process 600 is performed by the video event controller of FIG. 1.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 602, the process 600 includes a processing device capturing a live video scene at a first device. For example, a processing device of a user system captures a video scene using a camera that is connected to or integrated with the user system. In some embodiments, a processing device of a user system captures the live video scene.

At block 604, the process 600 includes a processing device ingesting the video scene into the computing system. For instance, the video event controller executes an ingestion script that transforms the live video scene into an electronic file format. The video event controller splits the electronic file format into a number of multimedia segments. The video event controller assigns metadata, e.g., capture parameters such as video quality, audio quality, or metadata to the live video scene stored in the electronic file format.

At block 606, the process 600 includes a processing device encoding the electronic file format into one or more video segments. For example, the video event controller encodes the live electronic file format into any form of video format as appropriate to the networking, camera, or other specifications. The video event controller encodes the timestamp data identifying a first time that the live video scene arrived at the ingestion server into each video segment. The video controller encodes each video segment into either compressed or uncompressed video files. The video event controller manipulates header information of the video files to include the time stamp data. The video event controller includes the timestamp by manipulating a header file or otherwise adding the timestamp into the metadata of the one or more video segments.

At block 608, the process 600 includes a processing device communicating the video segment to one or more content distribution networks. The video event controller transmits the video segment to the one or more content distribution networks. In some aspects, the video event controller uses a media cache to communicate one or more video segments to the one or more content distribution networks. The video event controller additionally or alternatively communicates the video segments directly to one or more user systems.

At block 610, the process 600 includes a processing device distributing, by the content distribution networks, the video segments to one or more second devices, e.g., to multiple different user systems over a network, such as the Internet. The content distribution networks are capable of receiving content requests from any number of user systems. In response to content requests received from user systems, the content distribution networks provide the video segments to the user systems.

At block 612, the process 600 includes a processing device presenting the live video stream to a user via a user interface of a user system. The user system presents the live video stream to the user using any presentation device suitable for presenting a multimedia presentation.

In another example, the video event controller controls the ingestion server, the content distribution network, the user systems, and intermediate devices in the network routing path based on an interaction of the users with user systems in response to presentation of the video segment. In one aspect, the video event controller increases a latency of a live video stream upon detecting a low interaction rate of the live video stream. In other aspects, the video event controller adjusts the network routing path to reduce latency for high interaction rate video segments.

Figure 7:
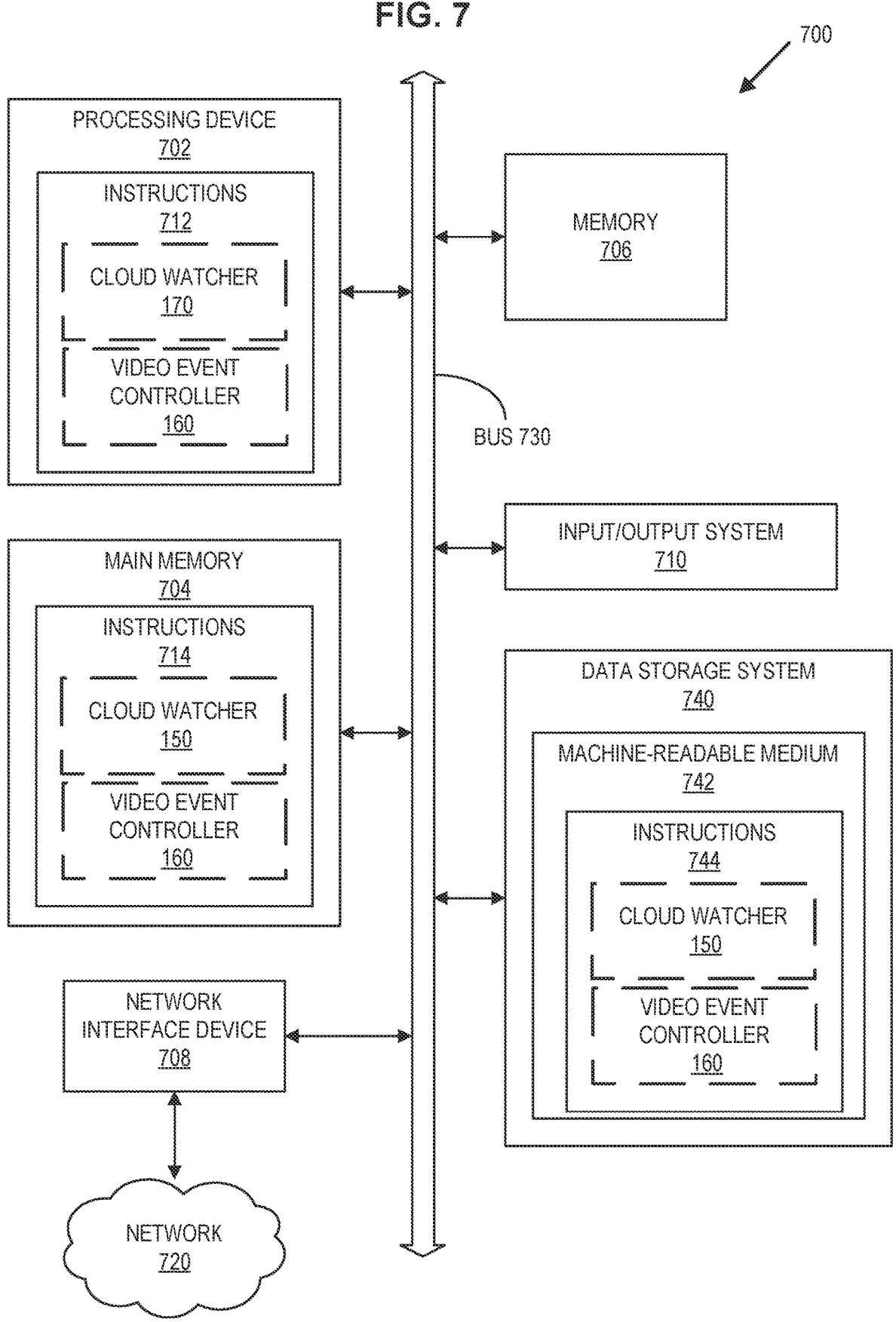
FIG. 7 illustrates an example machine of a computer system within which a set of instructions, for causing the machine to perform any one or more of the methodologies discussed herein, can be executed.

FIG. 7 illustrates an example machine of a computer system 700 within which a set of instructions, for causing the machine to perform any one or more of the methodologies discussed herein, can be executed. In some embodiments, the computer system 700 corresponds to a component of a networked computer system (e.g., the computing system 100 of FIG. 1) that includes, is coupled to, or utilizes a machine to execute an operating system to perform operations corresponding to the cloud watcher 150 or video event controller 160 of FIG. 1.

The machine is capable of being connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine is, for example, a personal computer (PC), a laptop computer, a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random-access memory (DRAM) such as synchronous DRAM (SDRAM) or Rambus DRAM (RDRAM), etc.), a memory 706 (e.g., flash memory, static random-access memory (SRAM), etc.), an input/output system 710, and a data storage system 740, which communicate with each other via a bus 730.

The main memory 704 is configured to store instructions 714 for performing the operations and steps discussed herein. Instructions 714 include portions of cloud watcher 150 and video event controller 160 when portions of cloud watcher 150 and video event controller 160 are stored in main memory 704. Thus, cloud watcher 150 and video event controller 160 are shown in dashed lines as part of instructions 714 to illustrate that portions of cloud watcher 150 and video event controller 160 can be stored in main memory 704. However, it is not required that cloud watcher 150 or video event controller 160 be embodied entirely in instructions 714 at any given time and portions of cloud watcher 150 and video event controller 160 can be stored in other components of computer system 700.

Processing device 702 represents one or more general-purpose processing devices such as a microprocessor, a central processing unit, or the like. More particularly, the processing device includes, for example, a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 alternatively or in addition includes one or more special-purpose processing devices such as an application specific integrated circuit (ASIC), a field programmable gate array (FPGA), a digital signal processor (DSP), network processor, or the like. The processing device 702 is configured to execute instructions 712 for performing the operations and steps discussed herein.

Instructions 712 include portions of cloud watcher 150 and video event controller 160 when those portions of cloud watcher 150 and video event controller 160 are being executed by processing device 702. Thus, similar to the description above, cloud watcher 150 and video event controller 160 are shown in dashed lines as part of instructions 712 to illustrate that, at times, portions of cloud watcher 150 and video event controller 160 are executed by processing device 702. For example, when at least some portion of cloud watcher 150 and video event controller 160 are embodied in instructions to cause processing device 702 to perform the method(s) described above, some of those instructions can be read into processing device 702 (e.g., into an internal cache or other memory) from main memory 704 and/or data storage system 740. However, it is not required that all of cloud watcher 150 or video event controller 160 be included in instructions 712 at the same time and portions of cloud watcher 150 and video event controller 160 are stored in one or more other components of computer system 700 at other times, e.g., when one or more portions of cloud watcher 150 and video event controller 160 are not being executed by processing device 702.

The computer system 700 includes a network interface device 708 to communicate over the network 720. Network interface device 708 provides a two-way data communication coupling to a network. For example, embodiments of network interface device 708 include an integrated-services digital network (ISDN) card, cable modem, satellite modem, or a modem to provide a data communication connection to a corresponding type of telephone line. As another example, network interface device 708 alternatively or in addition includes a local area network (LAN) card to provide a data communication connection to a compatible LAN, and/or one or more wireless links. In any such implementation network interface device 708 sends and receives electrical, electromagnetic, or optical signals that carry digital data streams representing various types of information and/or instructions.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 700.

Computer system 700 sends messages and receives data, including program code, through the network(s) and network interface device 708. In the Internet example, a server can transmit a requested code for an application program through the Internet and network interface device 708. The received code can be executed by processing device 702 as it is received, and/or stored in data storage system 740, or other non-volatile storage for later execution.

The input/output system 710 includes an output device, such as a display, for example a liquid crystal display (LCD) or a touchscreen display, for displaying information to a computer user, or a speaker, a haptic device, or another form of output device. The input/output system 710 includes an input device, for example, alphanumeric keys and other keys configured for communicating information and command selections to processing device 702. An input device includes, alternatively or in addition, a cursor control, such as a mouse, a trackball, or cursor direction keys for communicating direction information and command selections to processing device 702 and for controlling cursor movement on a display. An input device includes, alternatively or in addition, a microphone, a sensor, or an array of sensors, for communicating sensed information to processing device 702. Sensed information includes, for example, voice commands, audio signals, geographic location information, and/or digital imagery, for example.

The data storage system 740 includes a machine-readable storage medium 742 (also known as a computer-readable medium) on which is stored one or more sets of instructions 744 or software embodying any one or more of the methodologies or functions described herein. The instructions 744 can also reside, completely or at least partially, within the main memory 704 and/or within the processing device 702 during execution thereof by the computer system 700, the main memory 704 and the processing device 702 also constituting machine-readable storage media.

In one embodiment, the instructions 744 include instructions to implement functionality corresponding to a video event controller (e.g., the video event controller 160 of FIG. 1). Cloud watcher 150 and video event controller 160 are shown in dashed lines as part of instructions 744 to illustrate that, similar to the description above, portions of cloud watcher 150 and video event controller 160 can be stored in data storage system 740 alternatively or in addition to being stored within other components of computer system 700.

Dashed lines are used in FIG. 7 to indicate that it is not required that cloud watcher 150 and video event controller 160 be embodied entirely in instructions 712, 714, and 744 at the same time. In one example, portions of cloud watcher 150 and video event controller 160 are embodied in instructions 744, which are read into main memory 704 as instructions 714, and portions of instructions 714 are read into processing device 702 as instructions 712 for execution. In another example, some portions of cloud watcher 150 and video event controller 160 are embodied in instructions 744 while other portions are embodied in instructions 714 and still other portions are embodied in instructions 712.

While the machine-readable storage medium 742 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100, can carry out the computer-implemented processes in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

Aspects of the present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies can include any of the examples or a combination of the examples described below.

In an example 1, a method includes capturing a live video scene with a first device; ingesting the live video scene into a video segment; determining a first arrival time of the video segment at an ingestion server; encoding the video segment with a first timestamp associated with the first arrival time; distributing the video segment to one or more second devices, wherein the one or more second devices present the video segment to one or more users; and determining a latency of the video segment based on a measurement of time between a first time prior to the video segment being presented by the one or more second devices to the one or more users and a second time at or after the video segment is presented by the one or more second devices to the one or more users.

An example 2 includes the subject matter of example 1, where determining a latency of the video segment includes extracting, from the video segment, the first timestamp associated with the first arrival time; determining a second arrival time of the video segment at the one or more second devices; and computing the latency of the video segment as a combination of the first arrival time and the second arrival time. An example 3 includes the subject matter of example 1 or example 2, further including monitoring feedback from the one or more second devices to the first device, wherein the feedback indicates an interaction of the one or more users in response to the video segment; and setting a target latency for the video segment based on the feedback. An example 4 including the subject matter of any of examples 1-3, where setting a target latency is based on an engagement level associated with the video segment. An example 5 including the subject matter of any of examples 1-3, further including manipulating a header of the video segment to include the first arrival time, the second arrival time, and the first timestamp. An example 6 including the subject matter of any of examples 1-5, further including generating a pipeline offset based on a pipeline latency that indicates the latency measured between an ingestion server and an origin server; and manipulating the header of the video segment to include the pipeline offset. An example 7 including the subject matter of any of examples 1-6, further including determining that the latency of the video segment is greater than a threshold latency for a subset of the one or more second devices; and notifying the users of the subset of the one or more second devices that the latency of the video segment is greater than the threshold latency. An example 8 including the subject matter of any of examples 1-7, further including determining that adjusting a type, a connection, or an application of the subset of the one or more second devices causes in a reduction in the latency of the video segment; and notifying the users of the subset of the one or more second devices that an adjustment of the type, the connection, or the application reduces the latency of the video segment. An example 9 including the subject matter of any of examples 1-8, further including controlling a networking path from the first device to the one or more second devices based on the latency.

An example 10, a system includes a memory component; and a processing device, coupled to the memory component, configured to perform operations including capturing a live video scene with a first device; ingesting the live video scene into a video segment; encoding the video segment; distributing the video segment to one or more second devices, wherein the one or more second devices present the video segment to one or more users; and determining a latency of the video segment based on a measurement between a first time prior to the video segment being presented by the one or more second devices to the one or more users and a second time at or after the video segment is presented by the one or more second devices to the one or more users.

An example 11 including the subject matter of example 10, where the operation of determining a latency of the video segment includes determining a first arrival time of the video segment at an ingestion server; determining a second arrival time of the video segment at the one or more second devices; generating a pipeline offset based on a first timestamp corresponding to the first time and a second timestamp corresponding to the second time; and computing the latency of the video segment as a combination of the first arrival time, the second arrival time, and the pipeline offset. An example 12 including the subject matter of example 10 or example 11, further including monitoring feedback from the one or more second devices to the first device, wherein the feedback indicates an interaction of the one or more users in response to the video segment; and setting a target latency for the video segment based on the feedback. An example 13 including the subject matter of any of examples 10-12, where the target latency is inversely related to the feedback. An example 14 including the subject matter of any of examples 10-13 further including manipulating a header of the video segment to include the first arrival time, the second arrival time, the first timestamp, or the second timestamp. An example 15 including the subject matter of any of examples 10-14 further including determining that the latency of the video segment is greater than a threshold latency for a subset of the one or more second devices; and notifying the users of the subset of the one or more second devices that the latency of the video segment is greater than the threshold latency. An example 16 including the subject matter of any of examples 10-15 further including determining that adjusting a type, a connection, or an application of the subset of the one or more second devices causes in a reduction in the latency of the video segment; and notifying the users of the subset of the one or more second devices that an adjustment of the type, the connection, or the application reduces the latency of the video segment. An example 17 including the subject matter of any of examples 10-16 further including controlling a networking path from the first device to the one or more second devices based on the latency.

In an example 18, a method includes capturing a live video scene with a first device; ingesting the live video scene into a plurality of video segments; determining a first arrival time of the live video scene at an ingestion server; generating a first timestamp associated with the first arrival time for each video segment of the plurality of video segments; encoding the plurality of video segments, wherein the encoding comprises inserting the first timestamp into a header of each of the video segments of the plurality of video segments; distributing the plurality of video segments to a second device that presents the video segment to one or more users; and determining a latency of each video segment based on a comparison between the first timestamp in the header of each video segment to a second time at or after the video segment is presented by the second device to the one or more users.

An example 19 includes the subject matter of example 18, where determining a latency of each video segment includes generating a second timestamp associated with a second arrival time for each video segment of the plurality of video segments at the second device; extracting, from the header of each video segment, the first timestamp; computing the latency of the video segment as a combination of the first timestamp and the second timestamp. An example 20 including the subject matter of example 18 or example 19 further including computing a render latency for each video segment of the plurality of video segments, wherein the render latency indicates an amount of time between the second arrival time and a time that the video segment is presented by the second device to the one or more users.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:
1. A method, comprising:
capturing a live video scene with a first device;
ingesting the live video scene into a video segment;
determining a first arrival time of the video segment at an ingestion server;
encoding the video segment with a first timestamp associated with the first arrival time;

creating a producer reference time box (PRFT) for the video segment;
distributing the video segment to one or more second devices, wherein the one or more second devices present the video segment to one or more users;
simulating receiving of the video segment at the one or more second devices to compute an estimated render time;
determining a latency of the video segment based on a plurality of measurements of time between a first time prior to the video segment being presented by the one or more second devices to the one or more users and a second time at or after the video segment is presented by the one or more second devices to the one or more users, wherein the plurality of measurements of time comprise an elapsed time between a time indicated by the PRFT and at least two of: completion of the encoding of the video segment, serving of the video segment by one or more servers of a content distribution network, or the estimated render time; and
based on the plurality of measurements, identifying a particular component of a live video transmission pipeline as contributing to increased latency in the distribution of the live video scene from the first device to the one or more second devices.

2. The method of claim 1, wherein determining a latency of the video segment comprises:
extracting, from the video segment, the first timestamp associated with the first arrival time;
determining a second arrival time of the video segment at the one or more second devices; and
computing the latency of the video segment as a combination of the first arrival time and the second arrival time.

3. The method of claim 2, wherein setting a target latency is based on an engagement level associated with the video segment.

4. The method of claim 2 further comprising:
manipulating a header of the video segment to include the first arrival time, the second arrival time, and the first timestamp.

5. The method of claim 4 further comprising:
generating a pipeline offset based on the pipeline latency; and
manipulating the header of the video segment to include the pipeline offset.

6. The method of claim 1 further comprising:
determining that the latency of the video segment is greater than a threshold latency for a subset of the one or more second devices; and
notifying the users of the subset of the one or more second devices that the latency of the video segment is greater than the threshold latency.

7. The method of claim 6 further comprising:
determining that adjusting a type, a connection, or an application of the subset of the one or more second devices causes in a reduction in the latency of the video segment; and
notifying the users of the subset of the one or more second devices that an adjustment of the type, the connection, or the application reduces the latency of the video segment.

8. The method of claim 1 further comprising controlling a networking path from the first device to the one or more second devices based on the latency.

9. The method of claim 1, further comprising:
monitoring feedback from the one or more second devices to the first device, wherein the feedback comprises an interaction of the one or more users in response to the video segment; and
setting a target latency for the video segment based on the feedback.

10. The method of claim 1, wherein simulating the receiving of the video segment comprises:
simulating performance of a plurality of different types of user systems; and
estimating a render time for a combination of a simulated user system of a particular type, a video presentation application executed by the simulated user system, and a network connection of the simulated user system.

11. A system comprising:
a memory component; and
a processing device, coupled to the memory component, configured to perform operations comprising:
creating a producer reference time box (PRFT) for a video segment;
distributing the video segment to one or more second devices, wherein the one or more second devices present the video segment to one or more users;
simulating receiving of the video segment at the one or more second devices to compute an estimated render time;
determining a latency of the video segment based on a plurality of measurements of time between a first time prior to the video segment being presented by the one or more second devices to the one or more users and a second time at or after the video segment is presented by the one or more second devices to the one or more users, wherein the plurality of measurements of time comprise an elapsed time between a time indicated by the PRFT and at least two of: completion of the encoding of the video segment, serving of the video segment by one or more servers of a content distribution network, or the estimated render time, wherein determining the latency of the video segment comprises determining a pipeline latency that indicates latency measured between an ingestion server and an origin server of a live video transmission pipeline, and computing a render latency for the video segment that indicates an amount of time between a second arrival time of the video segment at a second device and a time that the video segment is presented by the second device; and
based on the plurality of measurements, identifying a particular component of the live video transmission pipeline as contributing to increased latency in the distribution of a live video scene from the first device to the one or more second devices.

12. The system of claim 11, wherein the operation of determining a latency of the video segment comprises:
determining a first arrival time of the video segment at an ingestion server;
determining a second arrival time of the video segment at the one or more second devices;
generating a pipeline offset based on a first timestamp corresponding to the first time and a second timestamp corresponding to the second time; and
computing the latency of the video segment as a combination of the first arrival time, the second arrival time, and the pipeline offset.

13. The system of claim 9, wherein the latency is inversely related to the feedback.

14. The system of claim 12, the operations further comprising:
  manipulating a header of the video segment to include the first arrival time, the second arrival time, the first timestamp, or the second timestamp.

15. The system of claim 11, the operations further comprising:
  determining that the latency of the video segment is greater than a threshold latency for a subset of the one or more second devices; and
  notifying the users of the subset of the one or more second devices that the latency of the video segment is greater than the threshold latency.

16. The system of claim 15, the operations further comprising:
  determining that adjusting a type, a connection, or an application of the subset of the one or more second devices causes in a reduction in the latency of the video segment; and
  notifying the users of the subset of the one or more second devices that an adjustment of the type, the connection, or the application reduces the latency of the video segment.

17. The system of claim 11, the operations further comprising controlling a networking path from the first device to the one or more second devices based on the latency.

18. The system of claim 11, the operations further comprising:
  monitoring feedback from the one or more second devices to the first device, wherein the feedback comprises an interaction of the one or more users in response to the video segment; and
  setting a target latency for the video segment based on the feedback.

19. A method of controlling a latency of a video stream, the method comprising:
  capturing a live video scene with a first device;
  ingesting the live video scene into a plurality of video segments;
  determining a first arrival time of the live video scene at an ingestion server;
  generating a first timestamp associated with the first arrival time for each video segment of the plurality of video segments;
  encoding the plurality of video segments, wherein the encoding comprises inserting the first timestamp into a header of each of the video segments of the plurality of video segments;
  creating a producer reference time box (PRFT) for each of the video segments of the plurality of video segments;
  distributing the plurality of video segments to a second device that presents the video segment to one or more users;
  simulating receiving of the video segment at the one or more second devices to compute an estimated render time;
  determining a latency of each video segment of the plurality of video segments based on a plurality of measurements of time comprising an elapsed time between a time indicated by the PRFT and at least two of: completion of the encoding of the video segment, serving of the video segment by one or more servers of a content distribution network, or the estimated render time, wherein determining the latency of the video segment comprises determining a pipeline latency that indicates latency measured between an ingestion server and an origin server of a live video transmission pipeline, and computing a render latency for the video segment that indicates an amount of time between a second arrival time of the video segment at a second device and a time that the video segment is presented by the second device; and
  based on the plurality of measurements, identifying a particular component of the live video transmission pipeline as contributing to increased latency in the distribution of the live video scene from the first device to the one or more second devices.

20. The method of claim 19, wherein determining a latency of each video segment comprises:
  generating a second timestamp associated with a second arrival time for each video segment of the plurality of video segments at the second device;
  extracting, from the header of each video segment, the first timestamp; and
  computing the latency of the video segment as a combination of the first timestamp and the second timestamp.

21. The method of claim 20 further comprising computing the render latency for each video segment of the plurality of video segments.

22. The method of claim 19, further comprising:
  monitoring feedback from the one or more second devices to the first device, wherein the feedback comprises an interaction of the one or more users in response to the video segment; and
  setting a target latency for the video segment based on the feedback.

* * * * *